(12) United States Patent  
Liu et al.

(10) Patent No.: US 6,397,204 B1  
(45) Date of Patent: May 28, 2002

(54) METHOD, SYSTEM, AND PROGRAM FOR DETERMINING THE JOIN ORDERING OF TABLES IN A JOIN QUERY

(75) Inventors: Lee-Chin Hsu Liu; Hong Sang Tie, both of San Jose; Shyh-Yee Wang, Cupertino, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/340,084

(22) Filed: Jun. 25, 1999

(51) Int. Cl.⁷ .............................................. G06F 17/30
(52) U.S. Cl. .................................. 707/2; 707/3; 707/4
(58) Field of Search .................................... 707/2, 3, 4

(56) References Cited

U.S. PATENT DOCUMENTS

| | | | |
|---|---|---|---|
| 5,043,872 A | 8/1991 | Cheng et al. | 707/2 |
| 5,301,317 A | 4/1994 | Lohman et al. | 707/2 |
| 5,345,585 A | 9/1994 | Iyer et al. | 707/2 |
| 5,367,675 A | 11/1994 | Cheng et al. | 707/2 |
| 5,423,035 A | 6/1995 | DePrez | 707/2 |
| 5,469,568 A | 11/1995 | Schiefer et al. | 707/2 |
| 5,546,576 A | 8/1996 | Cochrane et al. | 707/2 |
| 5,548,754 A | 8/1996 | Pirahesh et al. | 707/2 |
| 5,548,755 A | 8/1996 | Leung et al. | 707/2 |
| 5,548,758 A | 8/1996 | Pirahesh et al. | 707/2 |
| 5,615,361 A | 3/1997 | Leung et al. | 707/3 |
| 5,630,120 A | 5/1997 | Vachey | 707/2 |
| 5,671,403 A | 9/1997 | Shekita et al. | 707/3 |
| 5,680,603 A | 10/1997 | Bhargava et al. | 707/2 |
| 5,701,455 A | 12/1997 | Bhargava et al. | 707/2 |
| 5,706,494 A | 1/1998 | Cochrane et al. | 707/2 |
| 5,706,495 A | 1/1998 | Chadha et al. | 707/2 |
| 5,724,568 A | 3/1998 | Bhargava et al. | 707/4 |
| 5,734,893 A | 3/1998 | Li et al. | 707/2 |
| 5,758,146 A | 5/1998 | Schiefer et al. | 707/2 |
| 5,758,335 A | 5/1998 | Gray | 707/4 |
| 5,761,657 A | 6/1998 | Hoang | 707/4 |
| 5,765,159 A | 6/1998 | Srinivasan | 707/102 |
| 5,799,309 A | 8/1998 | Srinivasan | 707/102 |
| 5,822,750 A | 10/1998 | Jou et al. | 707/2 |
| 5,848,408 A | 12/1998 | Jakobsson et al. | 707/3 |
| 5,873,075 A | 2/1999 | Cochrane et al. | 707/2 |
| 5,873,083 A | 2/1999 | Jones et al. | 707/4 |
| 5,905,985 A | 5/1999 | Malloy et al. | 707/100 |
| 5,930,785 A * | 7/1999 | Lohman et al. | 707/2 |
| 6,029,163 A * | 2/2000 | Ziauddin | 707/2 |
| 6,105,018 A * | 8/2000 | Demers et al. | 707/2 |
| 6,272,487 B1 * | 8/2001 | Beavin et al. | 707/2 |
| 6,285,997 B1 * | 9/2001 | Carey et al. | 707/4 |
| 6,289,334 B1 * | 9/2001 | Reiner et al. | 707/3 |

OTHER PUBLICATIONS

An efficient hybrid join algorithm: a DB2 prototype Cheng, J.; Haderle, D.; Hedges, R.; Iyer, B.R.; Messinger, T.; Mohan, C.; Wang, Y.; Data Engineering, 1991. Proceedings. Seventh International Conference on , 1991; pp. 171–180.*

(List continued on next page.)

Primary Examiner—Diane D. Mizrahi  
(74) Attorney, Agent, or Firm—David W. Victor; Konrad Raynes Victor & Mann LLP

(57) ABSTRACT

Disclosed is a system, method, and program for joining a multi-column table and at least two satellite tables. Each satellite table is comprised of multiple rows and at least one join column and each multi-column table is comprised of multiple rows and join columns corresponding to the join columns in the satellite tables. A query including predicates is received. A join predicate column comprises the satellite table and multi-column table join column to which at least one query predicate applies. A determination is then made as to whether there is at least one index on the multi-column table including at least one column for one join predicate column. One index is selected. The ordering of the join predicate columns in the selected index is used to determine the join order of the satellite tables and the multi-column table. The satellite tables and multi-column tables are then joined in the determined join order.

33 Claims, 6 Drawing Sheets

OTHER PUBLICATIONS

IBM Technical Disclosure Bulletin, "Fast Table Joining in Relational Data Bases and Fast Row Retrieval", vol. 30, No. 2, Jul. 1987, pp. 750–757.

Arun Swami, "Optimization of Large Join Queries: Combining Heuristics and Combinatorial Techniques", ACM, 1989, pp. 367–376.

Disclosed Annonymously, "Building of All Data Objects Prior to Threaded Code Generation", Research Disclosure, Apr. 1989, No. 300, Kenneth Mason Publications Ltd, England.

IBM Technical Disclosure Bulletin, "Searching for Documents Within A Specified Nesting Level of Folders", vol. 32, No. 5A, Oct. 1989, pp. 396–397.

IBM Technical Disclosure Bulletin, "Extensible Design For Generating Alternative Join Sequences in a Relational Query Optimizer", vol. 32, No. 11, Apr. 1990, pp. 317–318.

IBM Technical Disclosure Bulletin, "Adaptive Join Algorithm", vol. 33, No. 1B, Jun. 1990, pp. 243–247.

IBM Technical Disclosure Bulletin, "Implementations of Extended Relational Operations", vol. 34, No. 4A, Sep. 1991, pp. 340–354.

P. Mishra, et al, "Join Processing in Relational Databases", ACM Computing Surveys, vol. 24, No. 1, Mar. 1992, pp. 63–113.

"Star Schema Processing for Complex Queries", Red Brick Systems, Inc., 1998, pp. 1–18.

* cited by examiner

METHOD, SYSTEM, AND PROGRAM FOR DETERMINING THE JOIN ORDERING OF TABLES IN A JOIN QUERY

CROSS-REFERENCE TO RELATED APPLICATIONS

This application is related to the following co-pending and commonly-assigned patent applications, all of which are filed on the same date herewith, and all of which are incorporated herein by reference in their entirety:

Method, System, and Program for a Join Operation on a Multi-Column Table and Satellite Tables Including Duplicate Values, to Stephen Yao Ching Chen, Patrick Michael Malone, Jerry Mukai, Jeffrey Ralph Ruggles, Desai Paramesh Sampatrai, Yun Wang, Guogen Zhang, having U.S. application Ser. No. 09/344,731 filed Jun. 25, 1999.

Method, System, and Program for Searching A List of Entries When Search Criteria Is Provided for less than All of the Fields in an Entry, to Tina Lee, Lee Chin Liu, Desai Paramesh Sampatrai, Hong S. Tie, S. Y. Wang, Yun Wang, having U.S. application Ser. No. 09/344,727 filed Jun. 25, 1999; and Method, System, and Program for Performing a Join Operation on a Multi-Column Table and Satellite Tables, to Stephen Yao Ching Chen, William Y. Kyu, Fen-Ling Lin, Desai Paramesh Sampatrai, and Yun Wang, having U.S. application Ser. No. 09/340,352 filed Jun. 25, 1999.

BACKGROUND OF THE INVENTION

1. Field of the Invention

The present invention relates to a method, system, and program for joining a multi-column table and at least two satellite tables and, in particular, determining the order of joining the satellite tables and multi-column table.

2. Description of the Related Art

Data records in a relational database management system (RDBMS) in a computer are maintained in tables, which are a collection of rows all having the same columns. Each column maintains information on a particular type of data for the data records which comprise the rows. One or more indexes may be associated with each table. An index an ordered set of pointers to data records in the table based on the data in one or more columns of the table. In some cases, all the information needed by a query may be found in the index, making it unnecessary to search the actual table. An index is comprised of rows or index entries which include an index key and a pointer to a database record in the table having the key column values of the index entry key. An index key is comprised of key columns that provide an ordering to records in a table. The index key columns are comprised of the columns of the table, and may include any of the values that are possible for that particular column. Columns that are used frequently to access a table may be used as key columns.

Organizations may archive data in a data warehouse, which is a collection of data designed to support management decision making. Data warehouses contain a wide variety of data that present a coherent picture of business conditions at a single point in time. One data warehouse design implementation is known as star schema or multidimensional modeling. The basic premise of star schemas is that information is classified into two groups, facts and dimensions. A fact table comprises the main data base records concerning the organization's key transactions, such as sales data, purchase data, investment returns, etc. Dimensions are tables that maintain attributes about the data in the fact table. Each dimension table has a primary key column that corresponds to a foreign key column in the fact table. Typically, the fact table is much larger than the related dimension tables.

The fact table typically comprises numerical facts, such as the date of a sale, cost, type of product sold, location, site of sale, etc. The dimension table usually provides descriptive textual information providing attributes on one of the fact table columns. For instance, a time dimension table can provide attributes on the date column in the fact table describing the date of sale. The time dimension table may provide various weather conditions or events that occurred on particular dates. Thus, the time dimension table provides attributes on the time, i.e., weather, important events, etc., about data columns in the fact table.

The star schema provides a view of the database on dimension attributes that are useful for analysis purposes. This allows users to query on attributes in the dimension tables to locate records in the fact table. A query would qualify rows in the dimension tables that satisfy certain attributes or join conditions. The qualifying rows of the dimension tables have primary keys that correspond to foreign keys in the fact table. A join operation, such as an equijoin or natural join, is then specified to qualify rows of the fact table. Typically, the primary key columns of the dimension tables in the join result are compared against the corresponding foreign key columns in the Fact table to produce the equijoin results.

FIG. 1 illustrates an example of a star schema 2 with multiple dimension tables 4, 6, and 8 and a fact table 10. The fact table 10 includes sales data, wherein each record includes information on the amount sold in the AMOUNT column 12; the time of sale in the TID column 14, which includes a time identifier; the product sold in the PID column 16 which is a product identifier; and the location of the sale, e.g., store location, in the GID column 18, which is a geographic identifier. The dimension tables 4, 6, and 8 provide attributes on the TID 14, PID 16, and GID 18 columns in the fact table.

The primary key columns of each of the dimension tables 4, 6, 8 are the TID column 20, PID column 28, and GID column 36, respectively. The columns 14, 16, and 18 in the fact table 10 are foreign keys that correspond to primary keys 20, 28, and 36 of the dimension tables 4, 6, 8 that provide attributes on the data in the fact table 10. For instance dimension table 4 provides attributes for each possible TID value, including month information in column 22, quarter of the TID in the quarter column 24, and the year of the TID in the year column 26. Dimension table 6 provides product attributes for each PID value, including the product item in item column 30, the class of the product in the class column 32, and the inventory location of the product in inventory column 34. The dimension table 8 provides attributes for each possible GID value, including the city of the GID in the city column 38, the geographical region in the region column 40, and the country in the country column 42.

Much effort has been expended in developing optimization techniques to select the best possible join ordering for queries in relational database systems. The order in which the joins are performed has a substantial impact on query performance. Each possible plan for executing an SQL statement is an access plan. The choice of an access plan among the many possible such plans has a substantial effect on performance during execution of the query and joining of tables. The number of possible joins to consider grows exponentially as tables are added to the query. Star schemas involve a large number of dimension tables in the join. Thus, a query optimizer would have to consider perhaps millions of possible permutations from which to select the optimal join order. Further, if a database program has many different join algorithms, then the query optimizer will have to analyze performance not only for every possible join permutation, but also for every possible join algorithm with every possible join permutation.

Most optimizers are cost based because they operate by generating a list of access plans, comparing their costs, and then selecting a least cost plan. Current cost based query evaluation techniques experience significant difficulties when used to evaluate a query involving numerous tables because the number of permutations or orderings to consider expands exponentially as the number of tables involved in the query increases. Many of these query evaluation techniques require significant processing time and memory usage to determine the optimal search plan.

One common query evaluation plan is to use dynamic programming algorithms, which often are difficult to infeasible or extremely consuming to process if many tables, e.g., ten tables or more, are involved in the join operation. The article entitled "Optimization of Large Join Queries: Combining Heuristics and Combinatorial techniques," by Arun Swami, in the ACM SIGMOD Record Vol. 18, No. 2, pgs. 367–376 by the Association for Computing Machinery (ACM Copyright 1989), discusses problems with dynamic programming query evaluation techniques as the number of tables involved in the query exceeds ten. This article is incorporated herein by reference in its entirety. The commonly assigned U.S. Pat. No. 5,301,317, entitled "System for Adapting Query Optimization Effort to Expected Execution Time," which is incorporated herein by reference in its entirety includes further discussion of dynamic programming query evaluation plans and their computational complexity and performance problems.

Other query evaluation techniques employ heuristic approaches to limit the search space when selecting an optimal search. Further, certain approaches use global optimization strategies to select a strategy that matches certain predefined criteria. Such techniques use substantially less processing cycles to select a query plan than the dynamic approach which requires consideration of all or most of the possible access paths. However, heuristic and global optimization techniques do not have the means for dynamically varying the search space and may not select the most desired join order plan.

There is thus a need in the art for an improved system, method, and program for selecting an optimal query plan or ordering of the join tables in a join operation.

SUMMARY OF THE PREFERRED EMBODIMENTS

To overcome the limitations in the prior art described above, preferred embodiments disclose a system, method, and program for joining a multi-column table and at least two satellite tables. Each satellite table is comprised of multiple rows and at least one join column and each multi-column table is comprised of multiple rows and join columns corresponding to the join columns in the satellite tables. A query including predicates is received. A join predicate column comprises the satellite table and multi-column table join column to which at least one query predicate applies. A determination is then made as to whether there is at least one index on the multi-column table including at least one column for one join predicate column. One index is selected. The ordering of the join predicate columns in the selected index is used to determine the join order of the satellite tables and the multi-column table. The satellite tables and multi-column tables are then joined in the determined join order.

In further embodiments, there are multiple indexes on the multi-column table, each including at least one column corresponding to one join predicate column. In such case, selecting one index comprises determining the join order for an index by using the ordering of the join predicate columns. Then, the cost of performing the join operation is estimated using the join order for each index. The index producing the join order having the lowest cost of the estimated costs for the determined join orders is selected to determine the join order and join processing.

In yet further embodiments, the join order comprises the satellite tables having join predicate columns ordered according to the order of the join predicate columns in the index. The multi-column table then follows the last satellite table in the join order.

Preferred embodiments provide a heuristic type program to determine join orders based on the indexes on the fact table. A cost estimate is then made for each of the join orders based on the indexes. The best cost join order is then selected to perform the query join. Preferred embodiments utilize a goal oriented heuristic algorithm to select different join orders to consider. Prior art methods, on the other hand, often consider the cost of all combinations of join orders. Preferred embodiments conserve substantial processing time by cost analyzing far fewer join orderings than current method which consider many combinations of the star joins. With the preferred ordering technique, the fact table or large multi-column table is only accessed once for any given query join. This avoids the need to use exhaustive query evaluation search techniques that consider many possible join orderings in the search space to select a best performing join ordering. Preferred embodiments, on the other hand, insure a result where the fact table is joined once, or some other minimal number of times, and wherein indexes are used to determine the ordering of the joins.

Because preferred embodiments consider the cost of a limited number of join orders, the preferred embodiments avoid long query compilation time and minimize storage usage during query compilation.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 2:
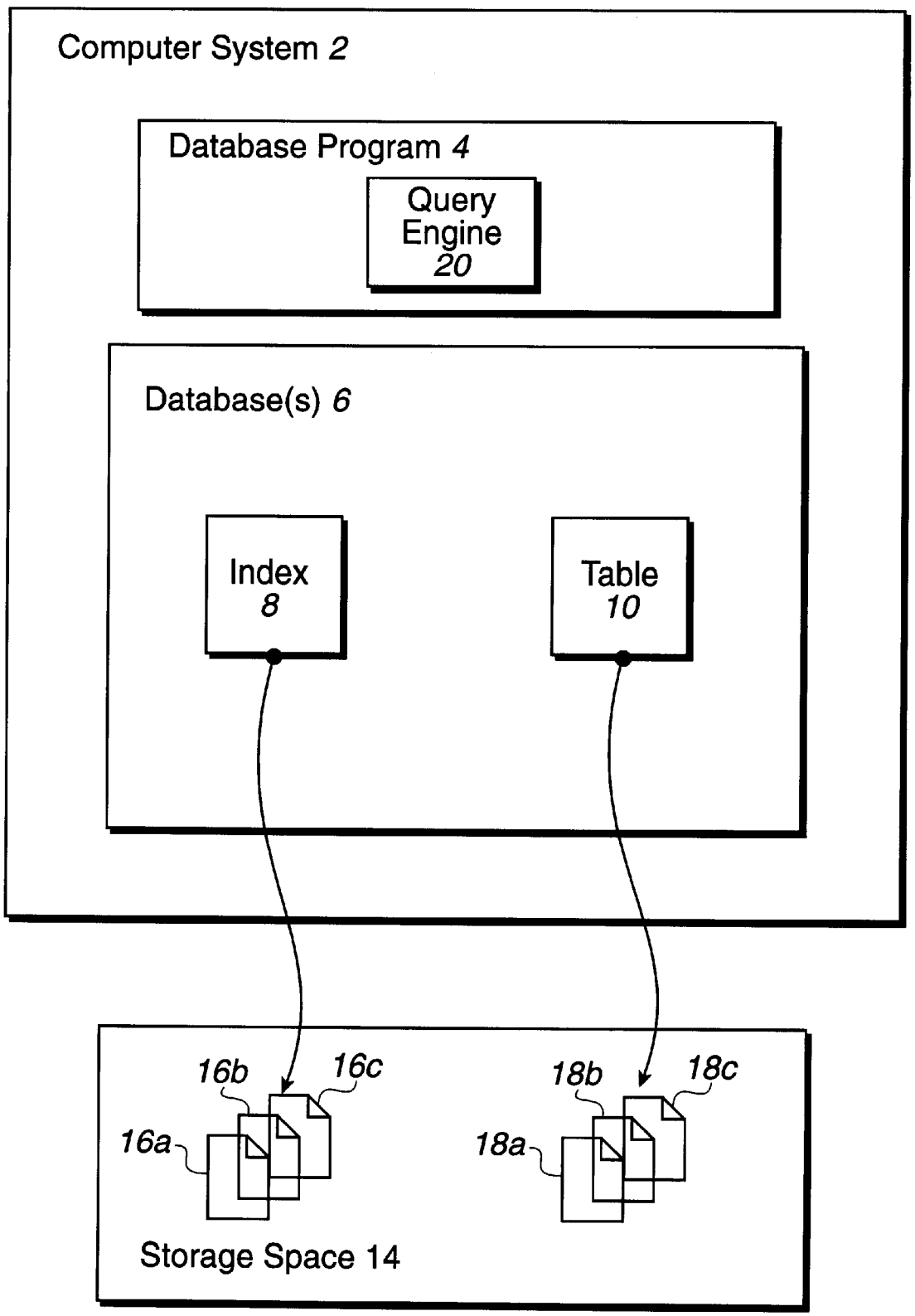
FIG. 2 illustrates a computing environment in which preferred embodiments are implemented.

FIG. 2 illustrates a computing environment in which a database may be implemented. A computer system 2, which may be a computer including an operating system such as MICROSOFT WINDOWS 98 and WINDOWS NT, AIX, OS/390, OS/2, MVS, etc., includes a database program 4, such as DB2, MICROSOFT Access, Oracle Corporation's ORACLE 8, etc. The database program 4 is used to access database information maintained in one or more databases 6. The database(s) 6 may consist of one or more indexes 8 and one or more tables 10. The indexes 8 provide an ordered set of pointers to data in the table 10 based on the data in one or more columns of the table.

Further details of the structure and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

A storage space 14 stores the actual data sets that include the data for the indexes and tables. The storage space 14 includes the pages 16a, b, c which contain the index entries for the index 8, such as the leaf pages when the index 8 is comprised of a B-tree. The storage space 14 further includes pages 18a, b, c of the records in the table 10. The storage space 14 may comprise a non-volatile storage space, such as a direct access storage device (DASD), which is comprised of numerous interconnected hard disk drives. Alternatively the storage space 14 may comprise storage pools within non-volatile memory, or a combination of non-volatile and volatile memories.

Figure 1:
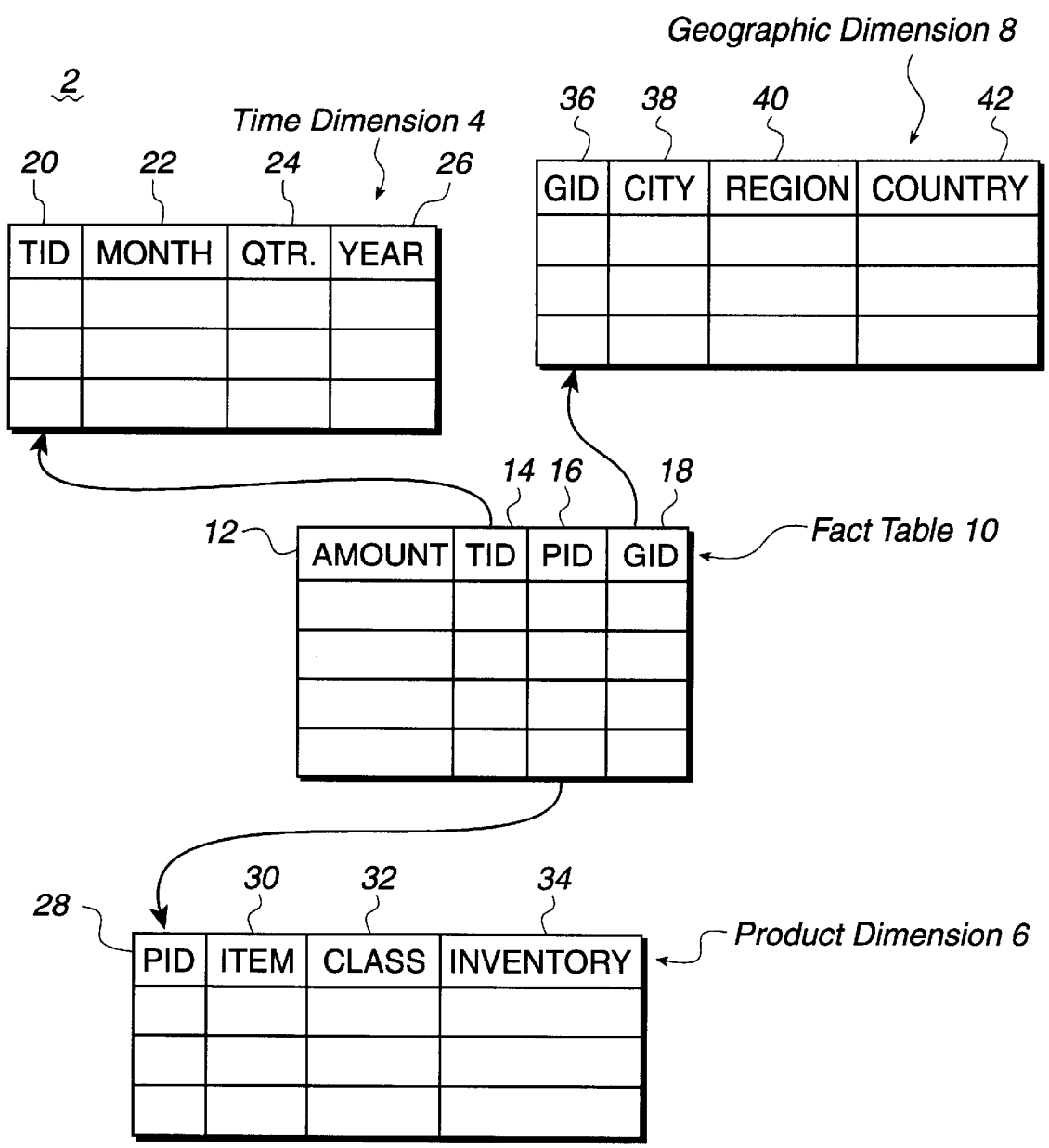
FIG. 1 illustrates the arrangement of database tables in a star schema in a manner known in the art.

The database program 4 includes a query engine 20 that may receive a search request on attributes in dimension tables to locate records in a fact table. In such case, the query engine may join the multiple tables, using optimization techniques known in the art, to optimally determine the order of joining the tables for purposes of searching for matching values. The database 6 may further include a star schema or multi-dimensional table design, such as the star schema illustrated in FIG. 1. Further details of the implementation of a star schema in a database program, such as that shown in FIG. 2, are described in the commonly assigned patent entitled "Relational Database Modifications Based on Multi-Dimensional Database Modifications," U.S. Pat. No. 5,905,985, which patent is incorporated herein by reference in its entirety.

Goal Oriented Optimization Method for Complex Query Using Star Schema

The optimization technique of the preferred embodiments is especially suited for large join query operations, such as when there are more than ten tables involved in the join query. Such large join query operations are often typical of star schema arrangements where there are multiple dimension tables and a large fact table, which is often many times larger than the dimension tables and includes columns for one or more columns in each of the dimension tables.

Figure 3:
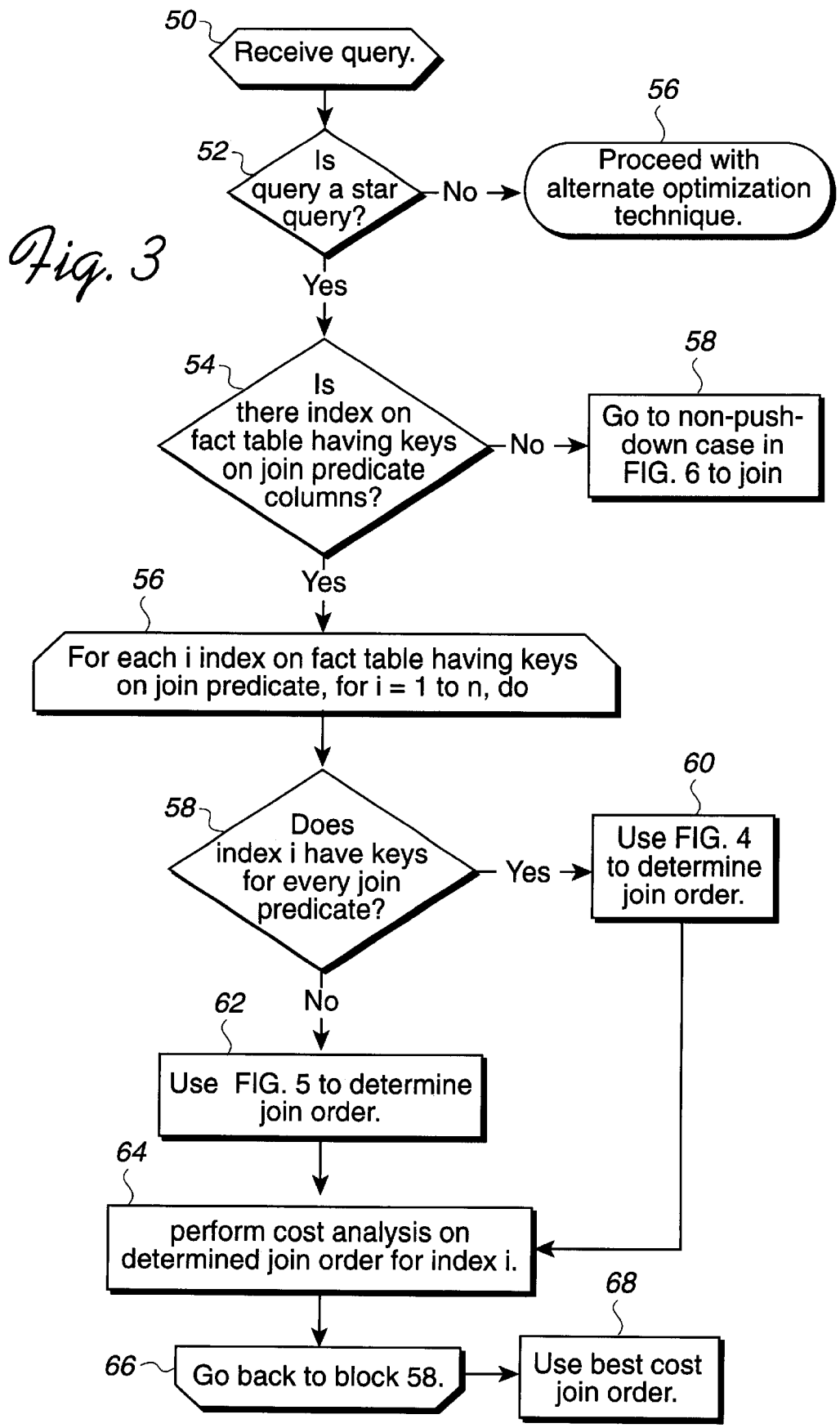
FIG. 3 illustrates logic to determine the join order of tables in accordance with preferred embodiments of the present invention.

FIG. 3 illustrates preferred logic for a goal oriented optimization method to select an index on the fact table to use when determining the join enumeration that specifies the order in which the dimension and fact tables are joined. The preferred logic may be implemented in the query optimizer component in the query engine 20, or part of the logic that determines the join order for tables subject to a query. Control begins at block 50 with the query engine 20 receiving a query. The query engine 20 determines whether the tables involved in the query comprise a star query. The query engine 20 may make such a determination by determining whether there is a large fact table that includes as foreign key columns primary key columns in the smaller tables, or dimension tables. If the characteristics of the tables do not satisfy some predefined characteristics associated with a star schema, then the query engine 20 utilizes an alternative optimization technique (at block 56) that is suitable for joining tables that do not form a star schema or are a large join operation, i.e., more than ten tables. If the tables involved in the query comprise a star schema, then the query engine 20 determines (at block 54) whether there are one or more indexes on the fact table having key columns on the join predicates. If so, control proceeds to block 56, otherwise, the query engine 20 proceeds (at block 58) to join the tables according to the non-push down scheme illustrated in FIG. 6.

A join column in the dimension table is a column that will be involved in the join operation. For instance, with respect to FIG. 1, the join column in the time dimension table 4 is the TID column 20; in the product dimension table 6 is the PID table 28; and in the geographic dimension table 8 is the GID column 36. The fact table has columns 14, 16, and 18 corresponding to the join columns in the dimension tables 4, 6, and 8, referred to herein as the fact table join columns. A join predicate is a predicate between a satellite table and the fact table. A join predicate column comprises a join column in the fact table and the corresponding join column in the satellite table that are subject to the query predicates. For instance, with respect to FIG. 1, if a search requested a TID value of a specific date, e.g., Jun. 31, 1997, and a PID value of a specific product, e.g., shoe, then the join predicate columns are the TID and PID columns in the dimension tables 20 and 28 and the fact table 14 and 16.

If there are one or more indexes on the fact table, the query engine 20 initiates a loop (at block 56) to estimate the cost of each join order for each of the i indexes on the fact table, where there are n indexes. For each index i, the query engine 20 determines (at block 58) whether index i has keys for every join predicate. If so, the query engine 20 uses (at block 60) the logic of FIG. 4 to determine the join order for index i. Otherwise, the query engine 20 uses (at block 62) the logic of FIG. 5 to determine the join order on index i. The query engine 20 then performs (at block 64) a cost analysis on the join order for index i. This cost analysis utilizes cost analysis techniques or cost function known in the art to estimate the time to perform the join operation in the specified join order based on the number of rows of the tables and join predicates involved in the join operation in a manner known in the art. After determining the cost of using each index to determine the join order according to the logic of FIGS. 4 and 5, the query engine 20 selects (at block 68) the lowest cost join order from the join orders determined by the n indexes as the join order to use. If there is only one index on the fact table having a join predicate column, than that index would be used to determine the join order.

Figure 4:
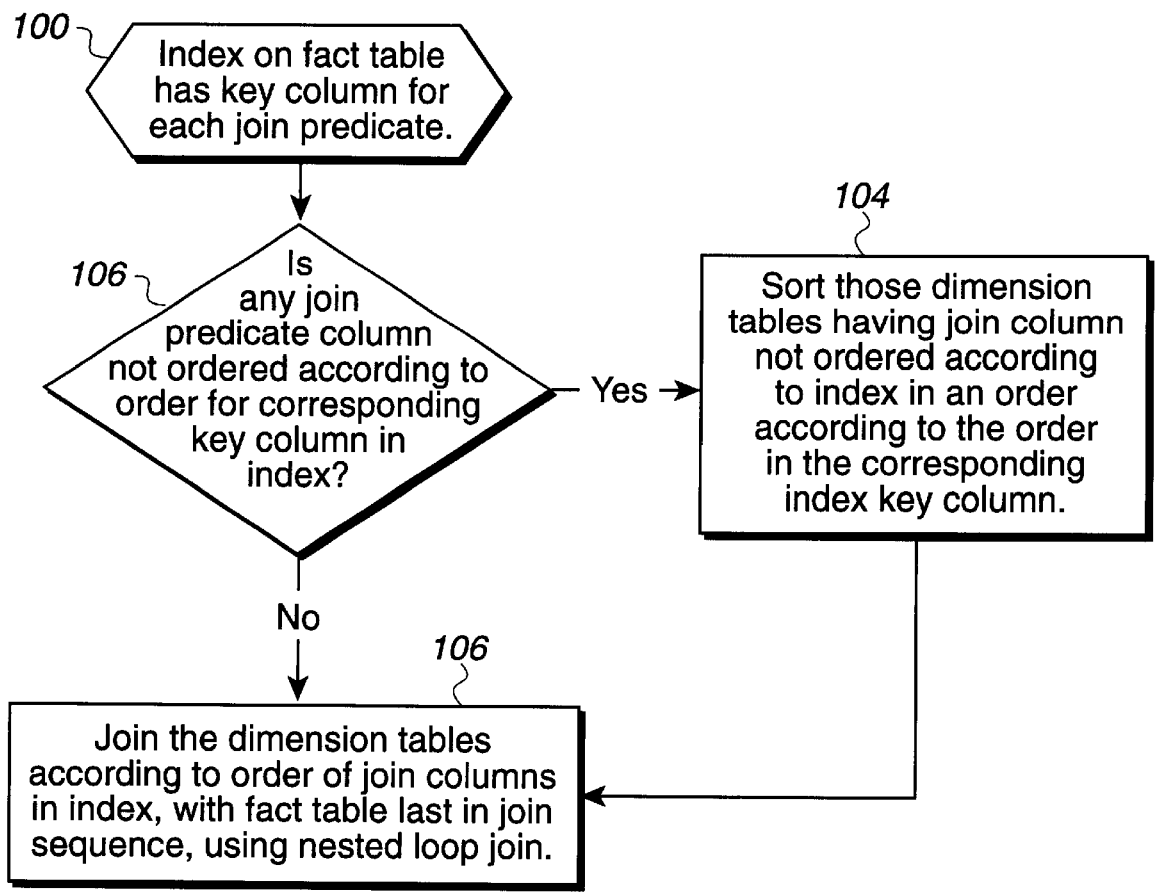
FIG. 4 illustrates logic to join the tables according to the join order when there is an index having columns for every join predicate column.
Figure 5:
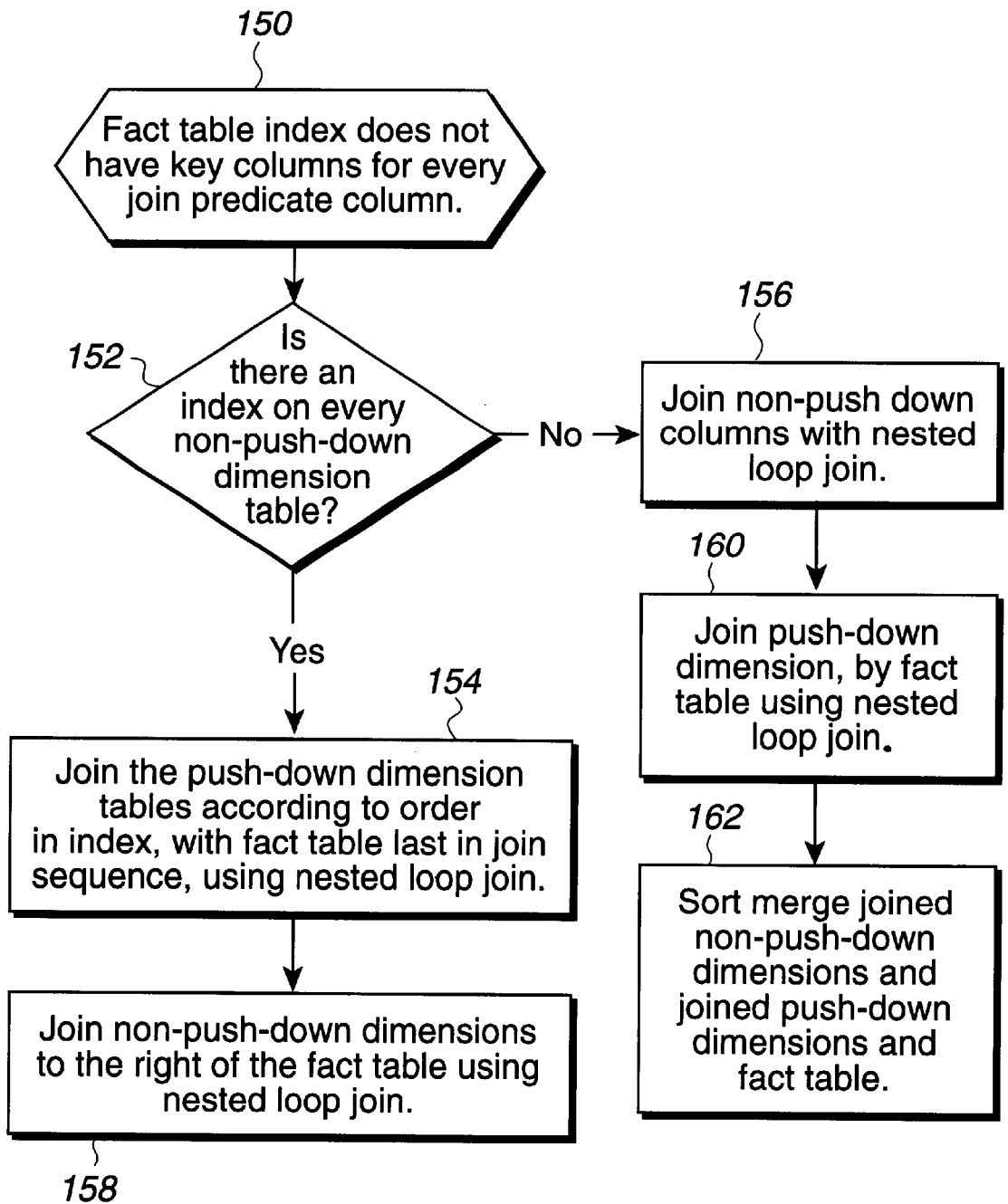
FIG. 5 illustrates logic to join the tables according to the join order when the index has columns for less than all the join predicate columns.

The logic of FIGS. 4–5 are used to determine the join order from an index on the fact table that has a key column on a join predicate. A fully pushed down star join occurs if there is an index on the fact table that has a key column for each join predicate column in the dimension tables. A partial push down is a star join where the index on the fact table does not have key columns for every join predicate. i.e., there is not a one-to-one mapping of the index columns to the join predicate columns. A push-down dimension table are those tables for which the index has a corresponding join column. A non-push down dimension table are those tables for which the index on the fact table does not have a join column on dimension table. Multiple tables can be joined by building table composites. For instance, to join three dimension tables (D1, D2, D3) and the fact table F, D1 and D2 are joined to build a two table composite, D3 is then joined to the composite D1, D2 to form a three table composite (D1, D2, D3), and then F is added to D1, D2, D3 to form the final join order for the join operation.

FIG. 4 provides logic for joining the tables in the fully pushed down case, i.e., when there is an index on the fact table that has keys for all the join columns. If there are multiple indexes having the same number of key columns on join predicate columns, then the query engine 20 selects the least cost index, such as the index with the highest clustering ratio. Upon determining (at block 100), that the selected index has columns for each dimension column on which there are predicates, the query engine 20 determines (at block 102) whether any join column is not ordered according to the ordering in the corresponding key column of the selected index. If so, the query engine 20 sorts (at block 104) those dimension tables having a join column not following the ordering in the corresponding key column of the index according to the order in the index. Otherwise, when all the join columns are in order according to the selected index, the query engine 20 joins (at block 106) the dimension tables in the order of the table's join column in the index, with the fact table the last in the join sequence. In preferred embodiments, the nested loop procedure is used to join the dimension tables.

FIG. 5 illustrates logic for the situation when the selected index on the fact table has key columns on less than all the join predicates of the dimension tables(at block 150), i.e., the partial push down case, then the query engine 20 determines (at block 152) whether there is an index on all the non-push down tables. If so, the query engine 20 joins (at block 154) the push-down dimension tables according to the ordering in the index, with the fact table the last join in the sequence. In preferred embodiments, joining is performed using nested loop joins. After joining the push-down dimension tables, the query engine 20 joins the non-push down dimension tables to the right of the joined fact table, using a nested loop join. If (at block 152), not all the non-push down dimension tables have an index on the join column, then the query engine 20 joins (at block 156) the non-pushdown columns the using the nested loop join routine. The query engine 20 then joins (at block 160) the push-down columns with the fact table last in the join sequence. The query engine then performs a sort merge join (at block 162) on the previously joined non-pushdown columns (at block 156) and the joined pushdown columns and fact table (at block 160). The sort merge join comprises sorting the join attributes on the tables to merge, scanning the rows of the table in the order of the join attributes, and merging the rows to produce concatenated rows that match the search criteria.

Figure 6:
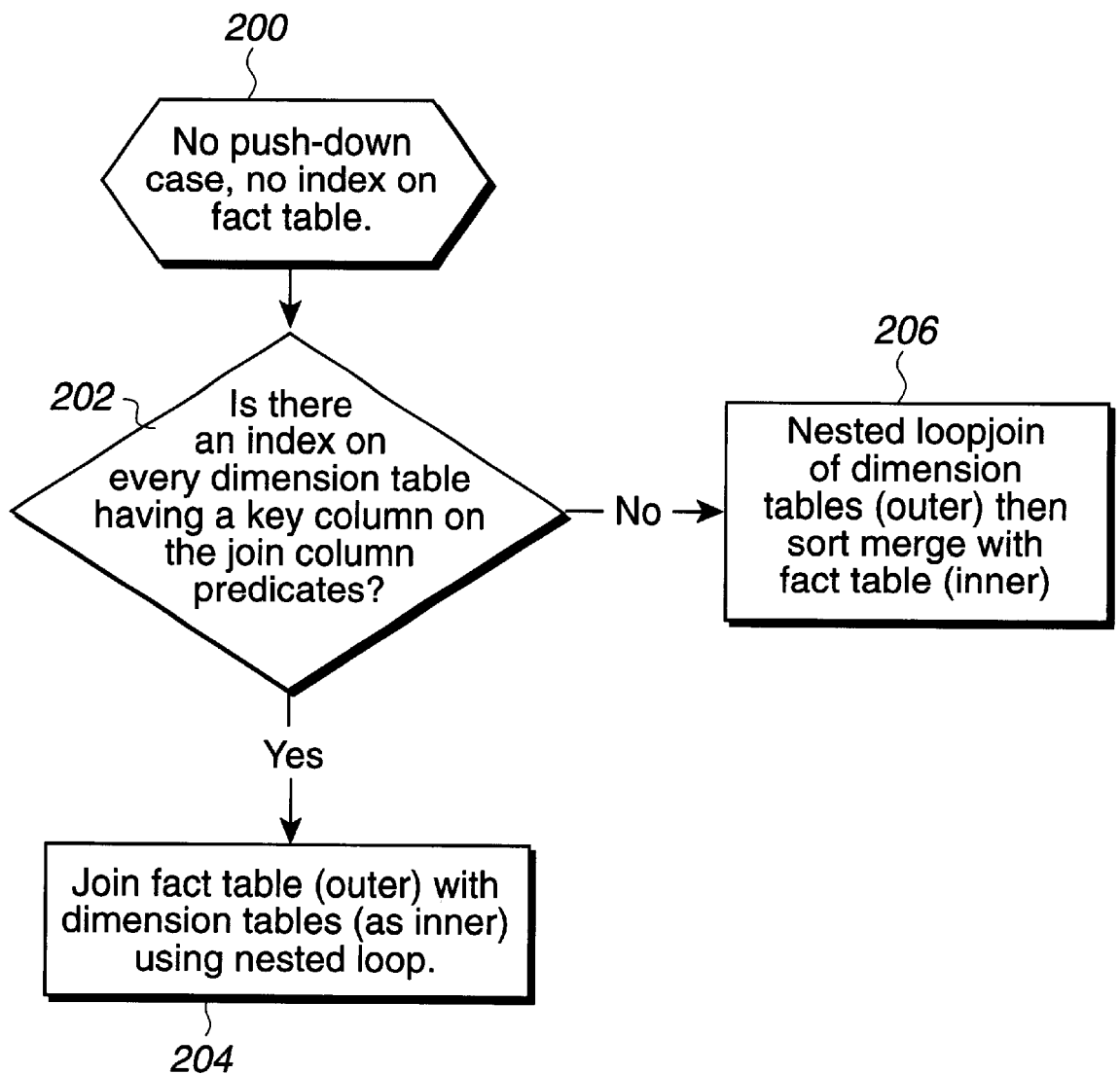
FIG. 6 illustrates logic to join tables when there is no index including columns for the join predicate columns.

FIG. 6 illustrates logic for the no-push down case, when there is no index or an useless index, such as an index that does not have a key columns on any of the join columns. In the no-push down case, at block 200, the query engine 20 determines whether all the dimension tables have an index on the join columns. If so, the query engine 20 joins (at block 204) the fact table to the dimension tables using a nested loop join with the fact table as the outer loop and the dimension tables as the inner loop. Otherwise, the query engine 20 performs (at block 204) a nested loop join of the dimension tables and then a sort merge join with the fact table. To join the dimension tables to sort merge with the fact table at block 206, the query engine 20 may utilize the algorithms in the co-pending and commonly assigned patent application, filed on the same date hereof, entitled "Method, System, and Program for a Join Operation on a Multi-column Table and Satellite Tables Including Duplicate Values," pending Application U.S. Ser. No. 09/344,731 filed Jun. 25, 1999, which application is incorporated herein by reference in its entirety.

Following is an example of the application of the logic of FIGS. 3–6. FDIJ is a key column on column J in dimension table I and DIJ is a dimension table column of column J in dimension table I. Below is a SQL query (1) example:

FROM D1, D2, D3, F                                  (1)

Where D11=FD11 and
D21=FD21 and
D31=FD31

The join predicate columns are D11, D21, and D31. If FI1 has key columns on FD11, FD21, and FD31 and FI2 has key columns on FD11 and FD21, then according to the logic of FIG. 3, FDI1 would be selected as the index to use because it has the largest number of key columns on join predicate columns. Because there is an index having a key column on every join predicate column, the join order would comprise D1, D2, D3, F applying the logic of FIG. 4.

The preferred embodiments provide a goal oriented optimization technique. A balance must be maintained on how early to include the fact table in the join sequence. Using the fact table earlier in the join sequence will increase the number of times the fact table must be scanned and produce a large join space early-on. However, joining the fact table earlier minimizes generating join results for subsequent join operations that do not exist in the fact table. Moreover, joining the fact table early may also produce join results that will not form joins with subsequent dimension tables. Using the fact table later on decreases the join complexity as the fact table has many more columns than the dimension tables. The preferred embodiments use the indexes on the fact table to determine a join order space of possible join orders which will be cost analyzed to select the lowest cost join order.

Moreover, by joining the dimension tables to the fact table according to an index ordering, the joining operation avoids the need to sort the tables before the join operation. Further, the join operation can utilize repositioning logic to further optimize the join operation between the dimension tables and fact tables, as described in "Method, System, and Program for a Join Operation on a Multi-column Table and Satellite Tables Including Duplicate Values," having pending Application U.S. Ser. No. 09/344,731 filed Jun. 25, 1999, which application was incorporated by reference above. The joining technique avoids having to sort on the join results from the joins of all the dimension tables by sorting each individual dimension table before the join. Further, by using an index to determine the order of the join, the preferred embodiments utilize the join correlation between the dimension table join key and the fact table index key. This further optimizes access as performing a join according to the ordering of an index having a high clustering minimizes the time to access records ordered according to the index.

Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to a query join on a large number of tables such as the case with a star join. However, the preferred logic may apply to any join involving a large number of tables, including other multi-dimensional joins such as snowflake joins, etc. A snowflake schema involves splitting the dimension tables at the level of the attributes. When dimensions are large (high cardinality), the dimension tables may be split such that a column of attributes comprises a separate table. Other schema combinations include "decomposed stars," "constellation schema," etc.

Preferred embodiments were described with respect to a query engine that performs the steps of generating a query and searching the fact table and dimension tables. However, in further embodiments, the functions performed by the query engine may performed with various components of a database management systems (DBMS) program.

Preferred embodiments were described with respect to a star join operation arrangement where dimension tables are joined to a fact table. However, the preferred logic may apply to any arrangement where there is a multi-column table with foreign key columns and multiple satellite tables that have as a primary key columns at least one of the foreign key columns of the primary table to maintain referential integrity between the multi-column table and satellite tables. Preferred embodiments are not limited solely to the star join arrangement. Further, the search criteria may include columns of the dimension table other than the primary key column or include the primary key column.

Those skilled in the art will appreciate that the searching algorithm of the preferred embodiments may apply to search operations performed with respect to any type of data structures comprised of columns or rows or a list of records that have values for common fields of information. The preferred embodiment search techniques are not limited to tables or other database structures, such as tables, indexes or other permutations of ordered data that must be considered.

The algorithm of the preferred embodiments was described as having particular steps in a particular order. However, alternative algorithms in accordance with the invention may include modifications, deletions, and/or additions to the steps described in the preferred embodiment algorithms. Such modified algorithms would still produce more efficient searches on missing columns than current methods for searching missing columns in multi-column indexes.

In summary, preferred embodiments disclose a system, method, and program for joining a multi-column table and at least two satellite tables. Each satellite table is comprised of multiple rows and at least one join column and each multi-column table is comprised of multiple rows and join columns corresponding to the join columns in the satellite tables. A query including predicates is received. A join predicate column comprises the satellite table and multi-column table join column to which at least one query predicate applies. A determination is then made as to whether there is at least one index on the multi-column table including at least one column for one join predicate column. One index is selected. The ordering of the join predicate columns in the selected index is used to determine the join order of the satellite tables and the multi-column table. The satellite tables and multi-column tables are then joined in the determined join order.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for joining a multi-column table and at least two satellite tables, wherein each satellite table is comprised of multiple rows and at least one join column and wherein the multi-column table is comprised of multiple rows and join columns corresponding to the join columns in the satellite tables, comprising:

receiving a query including predicates, wherein a join predicate column comprises the join column in the satellite table and multi-column table to which at least one query predicate applies;

determining whether there is at least one index on the multi-column table including at least one column for one join predicate column;

selecting one index;

using an ordering of the join predicate columns in the selected index to determine a join order of the satellite tables and the multi-column table; and joining the satellite tables and multi-column tables in the determined join order.

2. The method of claim 1, wherein there are multiple indexes on the multi-column table each including at least one column corresponding to one join predicate column, and wherein selecting one index comprises:

determining the join order for each of the multiple indexes using the ordering of the join predicate columns;

estimating, for each index, a cost of performing the join operation using the determined join order for that index; and selecting the index producing a join order having a lowest cost of the estimated costs for the determined join orders.

3. The method of claim 2, wherein determining the join order for one index comprises ordering the satellite tables having join predicate columns according to the ordering of the join predicate columns in that one index, wherein the multi-column table follows a last satellite table in the ordering defined by the join predicate columns in that one index.

4. The method of claim 2, further comprising:
determining whether an ordering within the join predicate column of one satellite table has the ordering of the corresponding join predicate column in the multi-column index; and
sorting each satellite join predicate column that is not in the order of the join predicate column in the multi-column index according to the ordering of the join predicate column in the multi-column index.

5. The method of claim 2, wherein determining the join order for one index comprises:
determining whether that one index has one column for each join predicate column in the satellite tables; and
defining the join order as the satellite tables ordered according to the ordering of the join predicate columns in that index followed by the multi-column table after determining that the one index has one column for each join predicate column in the satellite tables.

6. The method of claim 5, further comprising defining the join order as the satellite tables having corresponding join predicate columns in that one index followed by the multi-column table, and then followed by the satellite tables not having a join predicate column in that index after determining that the one index does not have one column for each join predicate column in the satellite tables.

7. The method of claim 6, wherein the satellite tables having one join predicate column in that index are ordered with respect to each other according to the order of the join predicate columns in that one index.

8. The method of claim 5, wherein joining the tables according to the join order is performed using nested loop joins.

9. The method of claim 6, further comprising:
determining whether there is an index for every satellite table that does not include one join predicate column;
wherein, after determining that there is an index for every satellite table not having one join predicate column, joining the tables comprises:
(i) using a nested loop join to join the satellite tables not having one join predicate column to form a first join result;
(ii) using a nested loop to join the satellite tables having one join predicate column according to the order of the join predicate columns in the selected index, followed by the multi-column table to form a second join result; and
(iii) sort merge joining the first and second join results.

10. The method of claim 1, wherein the selected index does not have any column corresponding to the join predicate column, wherein joining the satellite and multi-column tables comprises:
determining whether there is an index for each satellite table having a key column on the join predicate column in that satellite table; and
using the multi-column table as the outer table in a nested loop join with the dimension tables after determining that there is an index for each satellite table having a key column on one join predicate column in that satellite table.

11. The method of claim 10, further comprising performing, after determining that there is not an index for each satellite table having a key column on one join predicate column in that satellite table:
using nested loop joins to join the satellite tables; and
sort merge joining the joined satellite tables with multi-column fact table.

12. A system for determining a join ordering and performing a join operation involving a multi-column table and at least two satellite tables, comprising:
a computer;
a memory area accessible to the compute including one multi-column table and at least two satellite tables, wherein each satellite table is comprised of multiple rows and at least one join column and wherein the multi-column table is comprised of multiple rows and join columns corresponding to the join columns in the satellite tables; and
program logic executed by the computer, comprising:
(i) means for receiving a query including predicates, wherein a join predicate column comprises the join column in the satellite table and multi-column table to which at least one query predicate applies;
(ii) means for determining whether there is at least one index on the multi-column table including at least one column for one join predicate column; selecting one index;
(iii) means for using an ordering of the join predicate columns in the selected index to determine a join order of the satellite tables and the multi-column table; and
(iv) means for joining the satellite tables and multi-column tables in the determined join order.

13. The system of claim 12, wherein there are multiple indexes on the multi-column table each including at least one column corresponding to one join predicate column, and wherein the program logic for selecting one index comprises:
means for determining the join order for each of the multiple indexes using the ordering of the join predicate columns;
means for estimating, for each index, a cost of performing the join operation using the determined join order for that index; and
means for selecting the index producing the join order having a lowest cost of the estimated costs for the determined join orders.

14. The system of claim 13, wherein the program logic for determining the join order for one index comprises ordering the satellite tables having join predicate columns according to the ordering of the join predicate columns in that one index, wherein the multi-column table follows a last satellite table in the ordering defined by the join predicate columns in that one index.

15. The system of claim 13, wherein the program logic further comprises:
means for determining whether an ordering within the join predicate column of one satellite table has the ordering of the corresponding join predicate column in the multi-column index; and
means for sorting each satellite join predicate column that is not in the order of the join predicate column in the multi-column index according to the ordering of the join predicate column in the multi-column index.

16. The system of claim 13, wherein the program logic for determining the join order for one index comprises:
   means for determining whether that one index has one column for each join predicate column in the satellite tables; and
   means for defining the join order as the satellite tables ordered according to the ordering of the join predicate columns in that index followed by the multi-column table after determining that the one index has one column for each join predicate column in the satellite tables.

17. The system of claim 16, wherein the program logic further comprises means for defining the join order as the satellite tables having corresponding join predicate columns in that one index followed by the multi-column table, and then followed by the satellite tables not having join predicate columns in that index after determining that the one index does not have one column for each join predicate column in the satellite tables.

18. The system of claim 17, wherein the satellite tables having one join predicate column in that index are ordered with respect to each other according to the order of the join predicate columns in that one index.

19. The system of claim 16, wherein joining the tables according to the join order is performed using nested loop joins.

20. The system of claim 16, wherein the program logic further comprises:
   means for determining whether there is an index for every satellite table that does not include one join predicate column, wherein, after determining that there is an index for every satellite table not having one join predicate column, wherein the program logic for joining the tables comprises:
   (i) means for using a nested loop join to join the satellite tables not having one join predicate column to form a first join result;
   (ii) means for using a nested loop to join the satellite tables having one join predicate column according to the order of the join predicate columns in the selected index, followed by the multi-column table to form a second join result; and
   (iii) means for sort merge joining the first and second join results.

21. The system of claim 13, wherein the selected index does not have any column corresponding to the join predicate column, wherein joining the satellite and fact tables comprises:
   determining whether there is an index for each satellite table having a key column on the join predicate column in that satellite table; and
   using the fact table as the outer table in a nested loop join with the dimension tables after determining that there is an index for each satellite table having a key column on one join predicate column in that satellite table.

22. The system of claim 21, wherein after determining that there is not an index for each satellite table having a key column on one join predicate column in that satellite table, the program logic includes means for using nested loop joins to join the satellite tables and sort merge joining the joined satellite tables with the multi-column table.

23. An article of manufacture for use in programming a computer to join a multi-column table and at least two satellite tables, wherein each satellite table is comprised of multiple rows and at least one join column and wherein each multi-column table is comprised of multiple rows and join columns corresponding to the join columns in the satellite tables, the article of manufacture comprising computer useable media including at least one computer program embedded therein that is capable of causing the computer to perform:
   receiving a query including predicates, wherein a join predicate column comprises the satellite table and multi-column table join column to which at least one query predicate applies;
   determining whether there is at least one index on the multi-column table including at least one column for one join predicate column;
   selecting one index;
   using an ordering of the join predicate columns in the selected index to determine a join order of the satellite tables and the multi-column table; and
   joining the satellite tables and multi-column tables in the determined join order.

24. The article of manufacture of claim 23, wherein there are multiple indexes on the multi-column table each including at least one column corresponding to one join predicate column, and wherein selecting one index comprises:
   determining the join order for each of the multiple indexes using the ordering of the join predicate columns;
   estimating, for each index, a cost of performing the join operation using the determined join order for that index; and
   selecting the index producing the join order having a lowest cost of the estimated costs for the determined join orders.

25. The article of manufacture of claim 24, wherein determining the join order for one index comprises ordering the satellite tables having join predicate columns according to the ordering of the join predicate columns in that one index, wherein the multi-column table follows a last satellite table in the ordering defined by the join predicate columns in that one index.

26. The article of manufacture of claim 24, further causing the computer to perform:
   determining whether an ordering within the join predicate column of one satellite table has the ordering of the corresponding join predicate column in the multi-column index; and
   sorting each satellite join predicate column that is not in the order of the join predicate column in the multi-column index according to the ordering of the join predicate column in the multi-column index.

27. The article of manufacture of claim 24, wherein determining the join order for one index comprises:
   determining whether that one index has one column for each join predicate column in the satellite tables; and
   defining the join order as the satellite tables ordered according to the ordering of the join predicate columns in that index followed by the multi-column table after determining that the one index has one column for each join predicate column in the satellite tables.

28. The article of manufacture of claim 27, further causing the computer to perform defining the join order as the satellite tables having corresponding join predicate columns in that one index followed by the multi-column table, and then followed by the satellite tables not having a join predicate column in that index after determining that the one index does not have one column for each join predicate column in the satellite tables.

29. The article of manufacture of claim 28, wherein the satellite tables having one join predicate column in that index are ordered with respect to each other according to the order of the join predicate columns in that one index.

30. The article of manufacture of claim 27, wherein joining the tables according to the join order is performed using nested loop joins.

31. The article of manufacture of claim 29, further causing the computer to perform:

determining whether there is an index for every satellite table that does not include one join predicate column;

wherein, after determining that there is an index for every satellite table not having one join predicate column, joining the tables comprises:

(i) using a nested loop join to join the satellite tables not having one join predicate column to form a first join result;

(ii) using a nested loop to join the satellite tables having one join predicate column according to the order of the join predicate columns in the selected index, followed by the multi-column table to form a second join result; and (iii) sort merge joining the first and second join results.

32. The article of manufacture of claim 23, wherein the selected index does not have any column corresponding to the join predicate column, wherein joining the satellite and multi-column tables comprises:

determining whether there is an index for each satellite table having a key column on the join predicate column in that satellite table;

using the multi-column table as the outer table in a nested loop join with the dimension tables after determining that there is an index for each satellite table having a key column on one join predicate column in that satellite table.

33. The article of manufacture of claim 32, further comprising performing, after determining that there is not an index for each satellite table having a key column on one join predicate column in that satellite table:

using nested loop joins to join the satellite tables; and sort merge joining the joined satellite tables with the fact table.

* * * * *

UNITED STATES PATENT AND TRADEMARK OFFICE
CERTIFICATE OF CORRECTION

PATENT NO. : 6,397,204 B1
APPLICATION NO. : 09/340084
DATED : May 28, 2002
INVENTOR(S) : Lee-Chin Hsu Liu et al.

Page 1 of 1

It is certified that error appears in the above-identified patent and that said Letters Patent is hereby corrected as shown below:

(75) Inventors:
  Please insert --Yun Wang--

(56) References Cited
  Please insert --EP 0875838--

Column 10
  Line 65, delete "a join order" and insert --the join order--

Column 12
  Claim 11, line 6, insert --the-- after "with"
  Claim 11, line 7, delete "fact" after "column"
  Claim 12, line 12, delete "compute" and insert --computer--
  Claim 12, line 26, after ";" begin new paragraph with --selecting one index; --

Signed and Sealed this

Eighth Day of May, 2007

JON W. DUDAS
*Director of the United States Patent and Trademark Office*